No. 659,231. Patented Oct. 9, 1900.
H. HOPPE.
ATTACHMENT FOR HORSE HAY RAKES.
(Application filed June 5, 1900.)

(No Model.)

Witnesses  Hermann Hoppe Inventor

UNITED STATES PATENT OFFICE.

HERMANN HOPPE, OF SYKESTON, NORTH DAKOTA.

ATTACHMENT FOR HORSE HAY-RAKES.

SPECIFICATION forming part of Letters Patent No. 659,231, dated October 9, 1900.

Application filed June 5, 1900. Serial No. 19,163. (No model.)

*To all whom it may concern:*

Be it known that I, HERMANN HOPPE, a citizen of the United States, residing at Sykeston, in the county of Wells and State of North Dakota, have invented a new and useful Attachment for Horse Hay-Rakes, of which the following is a specification.

My invention is an attachment for horse hay-rakes designed to prevent the lateral discharge of the hay from the rake-teeth at the ends of the rake-head before the windrows are reached; and it consists in guard-wings adapted to be attached to the rake-teeth at the ends of the rake-head, as hereinafter fully described, and pointed out in the claims.

Figure 1:
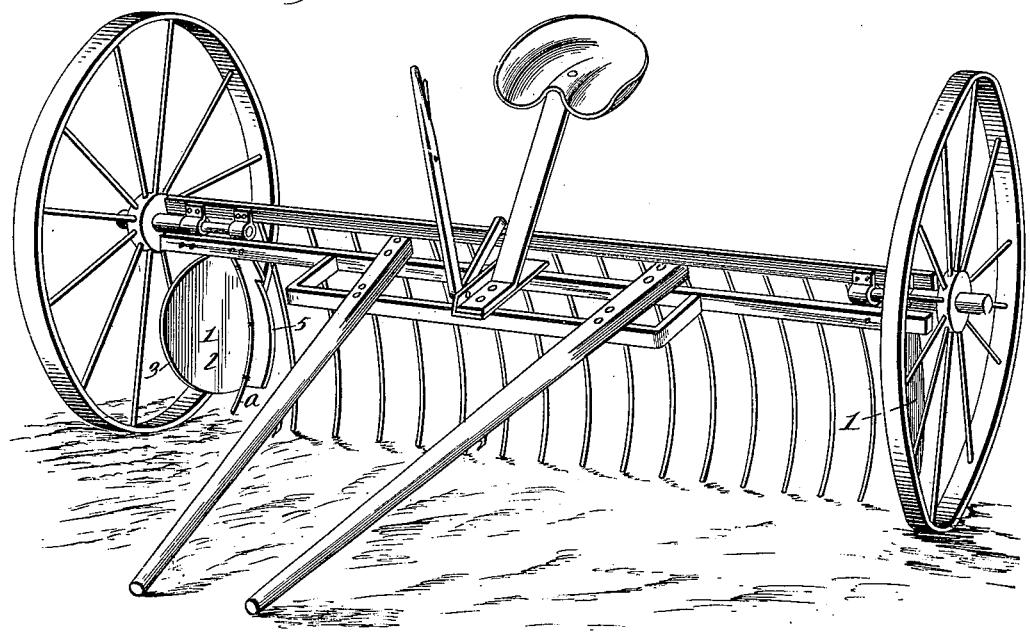
Figure 2:
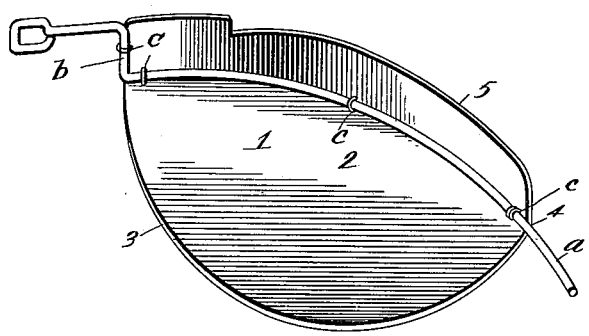

In the accompanying drawings, Figure 1 is a perspective view of a horse hay-rake provided with my improved guard attachments. Fig. 2 is a detail perspective view of one of the rake-teeth taken from the rake-head and to which one of my improved guard-wings is attached.

Heretofore horse hay-rakes have been provided at the ends of the rake-heads with short rake-teeth which are disposed in advance of the planes occupied by the intermediate rake-teeth in order to prevent the hay from being laterally discharged from the ends of the rake while being drawn over the ground to the windrows; but such construction has not been effective for such purpose, and more or less of the hay escapes from the ends of the rake and becomes scattered on the ground between the windrows. To obviate this defect in horse hay-rakes, I have invented guard-wings 1, which are adapted to be secured to the teeth at the ends of the rake and form effective means for preventing any of the hay from escaping from the ends of the rake. Each of said guards or wings comprises a curved plate 2 of suitable size, having the curved front edge 3 and the rear curved edge 4, the latter corresponding to the curvature of the rake-tooth *a*, to which it is to be secured. Said plate 2 is further provided at its rear curved edge with an inturned flange 5, which bears against the rear side of the rake-tooth, the latter being disposed in the angle between said plate and said flange. I further provide the rake-tooth *a*, near the upper end thereof, with a right-angled offset *b*, against which the upper portion of the flange 5 bears, and the said guard or wing is secured detachably to the said rake-tooth *a* by means of suitable clips or other devices, (indicated at *c*,) the said clips embracing the said rake-tooth at suitable points and one of said clips embracing the offset *b* of said tooth. Hence the guard or wing is secured to the rake-tooth so that it cannot turn thereon and so firmly that the plate 2 resists the pressure of the hay at the end of the rake and prevents the hay from falling therefrom. One of my improved guards or wings being secured in operative position at each end of the rake the same are effective in preventing the loss of hay from the ends of the rake before the windrows are reached.

Having thus described my invention, I claim—

1. In a horse hay-rake, the combination with a rake-tooth having an offset, of a guard or wing comprising a plate having a curved flange on its rear side adapted to bear against said rake-tooth and said offset thereof and means to secure said guard or wing to said tooth and said offset, substantially as described.

2. A horse hay-rake having a guard-plate disposed at right angles to the rake-head, at the end thereof, and extending downward therefrom, the rear side of said guard-plate being curved and provided with a bearing-flange, and a rake-tooth disposed and fitted in the angle formed by said plate and flange and secured to said plate and flange, substantially as described.

In testimony that I claim the foregoing as my own I have hereto affixed my signature in the presence of two witnesses.

HERMANN HOPPE.

Witnesses:
A. G. COVELL,
S. H. WINEY.